United States Patent
Wetterwald et al.

(10) Patent No.: US 10,673,883 B2
(45) Date of Patent: Jun. 2, 2020

(54) TIME SYNCHRONIZATION ATTACK DETECTION IN A DETERMINISTIC NETWORK

(71) Applicant: Cisco Technology, Inc., San Jose, CA (US)

(72) Inventors: Patrick Wetterwald, Mouans Sartoux (FR); Pascal Thubert, La Colle sur Loup (FR); Eric Levy-Abegnoli, Valbonne (FR); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 38 days.

(21) Appl. No.: 15/978,252

(22) Filed: May 14, 2018

(65) Prior Publication Data

US 2019/0349392 A1 Nov. 14, 2019

(51) Int. Cl.
*H04L 29/06* (2006.01)
*H04J 3/06* (2006.01)
(Continued)

(52) U.S. Cl.
CPC ........ *H04L 63/1425* (2013.01); *H04J 3/0658* (2013.01); *H04L 41/0803* (2013.01);
(Continued)

(58) Field of Classification Search
CPC . H04L 1/00; H04L 7/00; H04L 7/0008; H04L 7/0016; H04L 7/0025; H04L 7/0054; H04L 41/0803; H04L 43/00; H04L 43/0852; H04L 45/50; H04L 49/55; H04L 49/555; H04L 63/1408; H04L 63/1425; H04L 69/28; H04L 2012/5674; H04L 2027/0073; H04L 12/26; H04L 29/06;
(Continued)

(56) References Cited

U.S. PATENT DOCUMENTS 7,471,636 B2 * 12/2008 Vasseur ................... H04L 12/56
370/242
9,178,755 B2 11/2015 Dahlfort et al.
(Continued)

OTHER PUBLICATIONS

Lisova, et al., "Protecting Clock Synchronization: Adversary Detection through Network Monitoring", Journal of Electrical and Computer Engineering, vol. 2016, Article ID 6297476, 12 pages, 2016.
(Continued)

*Primary Examiner* — Tri H Phan
(74) *Attorney, Agent, or Firm* — Behmke Innovation Group LLC; James M. Behmke; Jonathon P. Western

(57) ABSTRACT

In one embodiment, a device receives data indicative of packet arrival times at a plurality of nodes along a path in a deterministic network. The device compares the packet arrival times to their corresponding scheduled delivery intervals in a deterministic communication schedule used by the nodes along the path. The device detects, using a machine learning-based anomaly detector, a time synchronization anomaly based on the comparisons between the packet arrival times and their scheduled delivery intervals. The device causes performance of a mitigation action in the network based on the detected time synchronization anomaly.

18 Claims, 10 Drawing Sheets

(51) Int. Cl.
*H04L 12/24* (2006.01)
*H04L 12/26* (2006.01)
*H04L 12/723* (2013.01)

(52) U.S. Cl.
CPC .......... *H04L 43/0852* (2013.01); *H04L 69/28* (2013.01); *H04L 45/50* (2013.01)

(58) Field of Classification Search
CPC .... G06F 11/00; G06F 13/1689; H04J 3/0658; H04J 3/06
See application file for complete search history.

(56) References Cited

U.S. PATENT DOCUMENTS

| | | | | |
|---|---|---|---|---|
| 9,813,435 | B2 * | 11/2017 | Muddu | H04L 43/045 |
| 9,900,332 | B2 * | 2/2018 | Muddu | G06F 40/134 |
| 10,097,471 | B2 * | 10/2018 | Vasseur | H04L 47/2425 |
| 10,148,537 | B2 * | 12/2018 | Vasseur | H04L 69/22 |
| 10,389,738 | B2 * | 8/2019 | Muddu | G06N 5/04 |
| 10,419,450 | B2 * | 9/2019 | Muddu | H04L 63/06 |
| 2014/0198784 | A1 * | 7/2014 | Nakajima | H04J 3/0641 370/350 |
| 2017/0078170 | A1 | 3/2017 | Vasseur et al. | |
| 2017/0099226 | A1 | 4/2017 | Vasseur et al. | |
| 2017/0149639 | A1 | 5/2017 | Vasseur et al. | |
| 2017/0286675 | A1 * | 10/2017 | Shin | G06F 1/12 |
| 2017/0289846 | A1 | 10/2017 | Wetterwald et al. | |

OTHER PUBLICATIONS

Mizrahi, et al., "Deterministic Networking (DetNet) Security Considerations", <draft-sdt-detnet-security-01>, 35 pages, Jul. 2, 2017, IETF Trust.

Pathan, et al., "Analysis of selective packet delay attack on IEEE 1588 Precision Time Protocol", https://www.colorado.edu/itp/sites/default/files/attached-files/team_7_-_arun_ravindran_pillai_-_apr_25_2014_433_pm_-_group_7_final.pdf, 21 pages, Apr. 25, 2014, University of Colorado at Boulder.

Rossberg, et al., "Attack-Resistant Distributed Time Synchronization for Virtual Private Networks", 2012 21st International Conference on Computer Communications and Networks (ICCCN), 8 pages, 2012, IEEE.

Sugihara, et al., "Clock Synchronization with Deterministic Accuracy Guarantee", EWSN'11 Proceedings of the 8th European conference on Wireless sensor networks, pp. 130-146, 2011, Springer-Verlag.

"Avnu Alliance", http://avnu.org/, Accessed on Dec. 7, 2017, 3 pages, Avnu.

"Deterministic Networking (detnet)", https://datatracker.ietf.org/wg/detnet/about/, Accessed on Jan. 31, 2018, 3 pages, IETF.

"Industrial Internet Consortium", http://www.iiconsortium.org, 3 pages, Accessed Dec. 7, 2017, Object Management Group, Inc.

"Time-Sensitive Networking Market by Component (Switches, Hubs, Routers, and Gateways, and Memory), Application (Industrial Automation, Power and Energy, Automotive, Transportation, Oil & Gas, Aerospace), and Geography—Global Forecast to 2024", https://www.marketsandmarkets.com/Market-Reports/time-sensitive-networking-market-215000493.html, 2 pages, Accessed on Dec. 7, 2017, MarketsandMarkets Research Private Ltd.

"Time-Sensitive Networking Task Group", http://www.ieee802.org/1/pages/tsn.html, Accessed on Jan. 31, 2018, 2 pages, Institute of Electrical and Electronics Engineers, Inc.

"Unified Architecture", https://opcfoundation.org/about/opc-technologies/opc-ua/, Accessed on Jan. 31, 2018, 2 pages, OPC Foundation.

Sajassi et al. "BGP MPLS Based Ethernet VPN draft-ietf-l2vpn-evpn-11" Network Working Group Internet-Draft; Oct. 18, 2014; pp. 1-52.

P. Thubert "An Architecture for IPv6 over the TSCH mode of IEEE 802.15.4 draft-ietf-6tisch-architecture-14" 6TiSCH Internet-Draft; Apr. 25, 2018; pp. 1-57.

* cited by examiner

TIME SYNCHRONIZATION ATTACK DETECTION IN A DETERMINISTIC NETWORK

TECHNICAL FIELD

The present disclosure relates generally to computer networks, and, more particularly, time synchronization attack detection in a deterministic network.

BACKGROUND

In general, deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

While deterministic networks are increasing in use, a new form of network attack has also emerged: time synchronization attacks. Generally, such attacks seek to disrupt the time synchronization between the network devices, thereby causing packets to be dropped and/or buffers to overflow.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
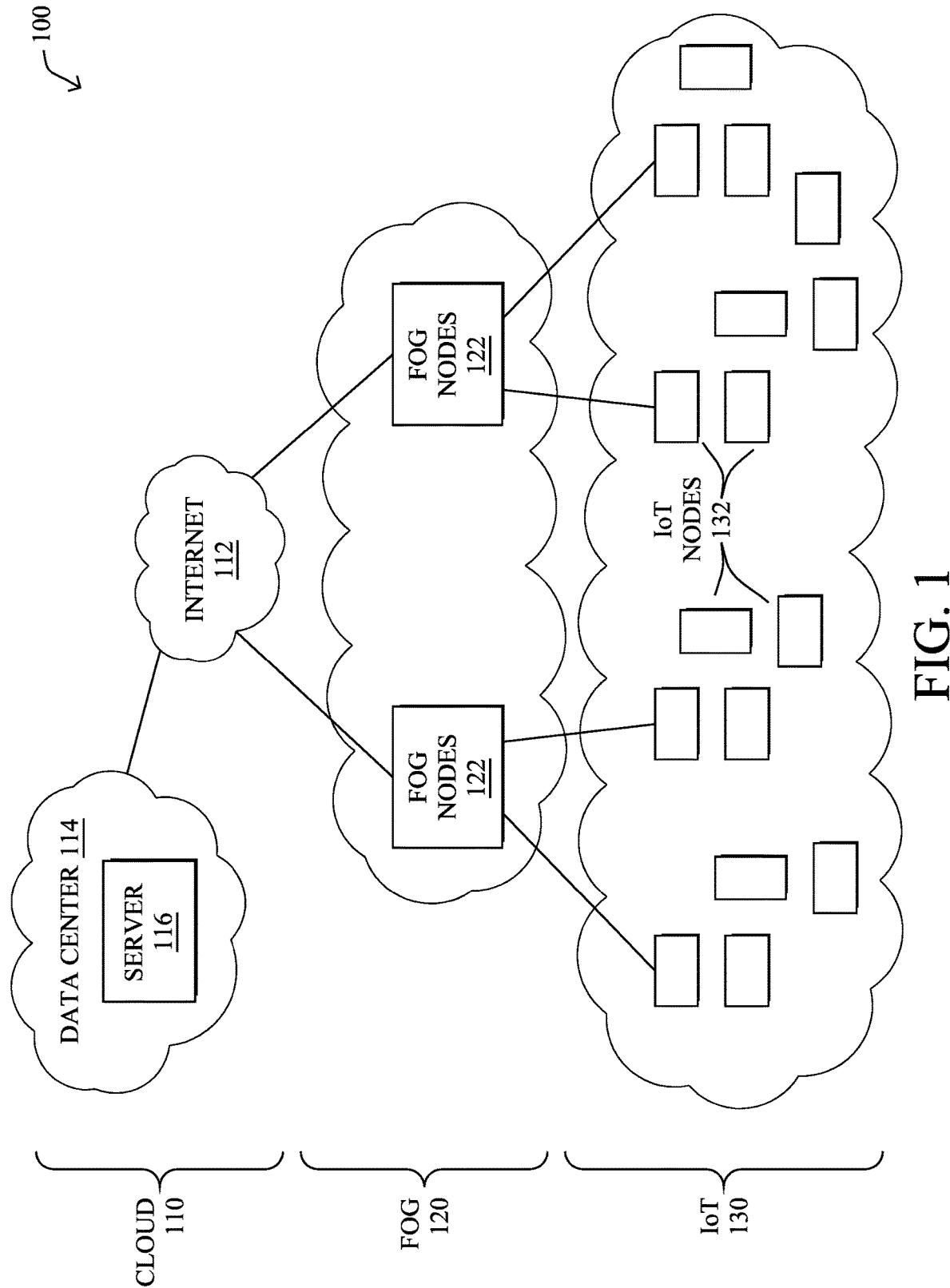
FIG. 1 illustrates an example computer network.

According to one or more embodiments of the disclosure, a device receives data indicative of packet arrival times at a plurality of nodes along a path in a deterministic network. The device compares the packet arrival times to their corresponding scheduled delivery intervals in a deterministic communication schedule used by the nodes along the path. The device detects, using a machine learning-based anomaly detector, a time synchronization anomaly based on the comparisons between the packet arrival times and their scheduled delivery intervals. The device causes performance of a mitigation action in the network based on the detected time synchronization anomaly.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc. . . . ), PLC protocols, or other shared-media protocols where appropriate. In this context, a protocol consists of a set of rules defining how the nodes interact with each other.

Figure 2:
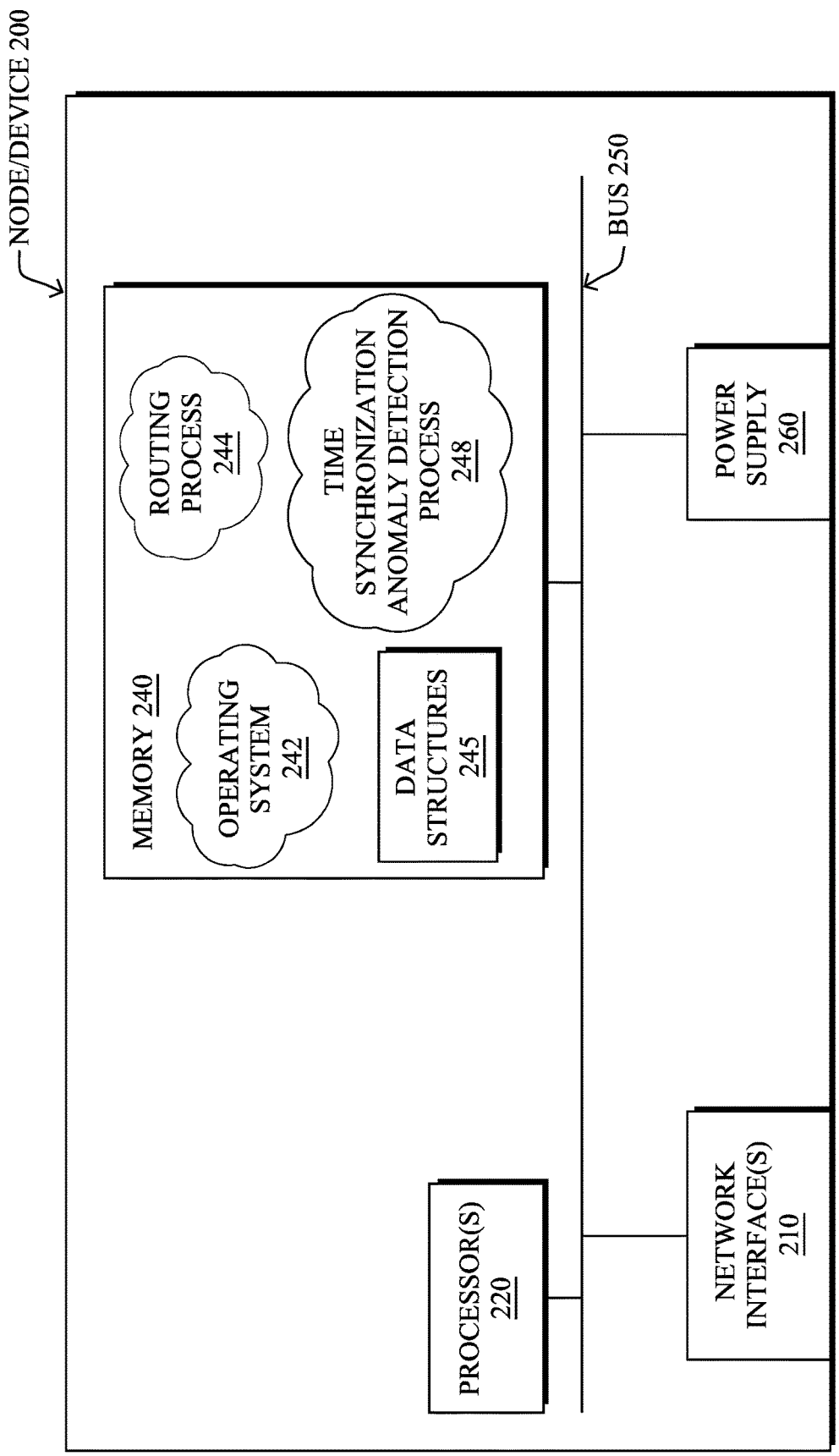
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise a routing process 244 and/or a time synchronization anomaly detection process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-12vpn-evpn>, introduce a solution for multipoint L2VPN services, with advanced multi-homing capabilities, using BGP for distributing customer/client media access control (MAC) address reach-ability information over the core MPLS/IP network.

Another example protocol that routing process 244 may implement, particularly in the case of LLN mesh networks, is the Routing Protocol for Low Power and Lossy (RPL), which provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

According to various embodiments, node/device 200 may communicate deterministically within a network. Notably, many low power wireless industrial process control typically uses 1 Hz to 4 Hz control loops, and for those, a scheduled MAC protocol can be considered deterministic, even when clocks drift in the order of tens of parts per million (ppm). A low-throughput technology such as IEEE 802.15.4 may thus be adapted to support determinism. In particular, the bandwidth can be pre-formatted in a time division multiplexing (TDM) fashion using IEEE 802.15.4, and time slots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH." The centralized computation is typically done by a path computation engine (PCE) with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

For distributed routing, 6TiSCH relies on the RPL routing protocol. The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery). Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

Example standards for deterministic networking/TSN include, but are not limited to, Institute of Electrical and Electronics Engineers (IEEE) 802.1Qca, 802.1Qbv, 802.1Qbu/802.3br, 802.1Qch, 802.1AS-Rev, 1588 v2, 802.1Qcc, 802.1Qci, 802.1CB, and 802.1CM. Likewise, the Internet Engineering Task Force (IETF) has established a deterministic network (DetNet) working group to define a common deterministic architecture for Layer 2 and Layer 3. Further standards for deterministic networking also include OPC Unified Architecture (UA) from the OPC Foundation, as well as the International Electrotechnical Commission (IEC) 61850-90-13 and MT-9 standards. As would be appreciated, the deterministic networking standards listed above are exemplary only and the techniques herein can be used with any number of different deterministic networking protocols.

In general, time synchronization anomaly detection process 248 may execute one or more machine learning-based analyzer to detect time synchronization anomalies along a path in a deterministic network. In one embodiment, time synchronization anomaly detection process 248 may assess captured data regarding one or more traffic flows along the path, to determine whether clock drifts among the nodes along the path are anomalous. For example, time synchronization anomaly detection process 248 may detect path-level anomalies (e.g., cumulative clock drift along the path) and/or hop-level anomalies that may indicate the presence of a time synchronization attack that attempts to disrupt the determinism of the path.

Time synchronization anomaly detection process 248 may employ any number of machine learning techniques, to detect a time synchronization anomaly. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, process 248 can use the model M to classify new data points, such as information regarding new traffic flows in the network. Often, M is a statistical model, and the cost function is inversely proportional to the likelihood of M, given the input data.

In various embodiments, time synchronization anomaly detection process 248 may employ one or more supervised, unsupervised, or semi-supervised machine learning models. Generally, supervised learning entails the use of a training set of data that is used to train the model to apply labels to the input data. For example, the training data may include sample data collected from the network that is deemed "normal," or "anomalous." On the other end of the spectrum are unsupervised techniques that do not require a training set of labels. Notably, while a supervised learning model may look for previously seen patterns that have been labeled as such, an unsupervised model may instead look to whether there are sudden changes in the behavior of the network (e.g., clock drifts that statistically differ from previously seen drifts by a threshold amount). Semi-supervised learning models take a middle ground approach that uses a greatly reduced set of labeled training data.

Example machine learning techniques that time synchronization anomaly detection process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times time synchronization anomaly detection process 248 incorrectly deemed the delivery times of packets along a deterministic path to be anomalous or indicative of a time synchronization attack. Conversely, the false negatives of the model may refer to the number of times process 248 deemed the behavior of the deterministic path as normal, when it is actually anomalous. True negatives and positives may refer to the number of times process 248 correctly deemed the behavior of the deterministic path as normal or anomalous, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In various embodiments, node/device 200 may be configured to function as part of a deterministic network. As noted above, deterministic networking represents recent efforts to extend networking technologies to industrial settings. Indeed, industrial networking requires having predictable communications between devices. For example, consider a control loop in which a controller controls an actuator, based on a reading from a sensor. In such a case, a key requirement of the network may be the guarantee of packets being delivered within a bounded time. This translates into the following characteristics needed by a typical deterministic network:

High delivery ratio (e.g., a loss rate of $10^{-5}$ to $10^{-9}$, depending on the application)
Fixed latency
Jitter close to zero (e.g., on the order of microseconds)

A limited degree of control can be achieved with QoS tagging and shaping/admission control. For time sensitive flows, though, latency and jitter can only be fully controlled with the effective scheduling of every transmission at every hop. In turn, the delivery ratio can be optimized by applying 1+1 packet redundancy, such as by using High-availability Seamless Redundancy (HSR), Parallel Redundancy Protocol (PRP), or the like, with all possible forms of diversity, in space, time, frequency, code (e.g., in CDMA), hardware (links and routers), and software (implementations).

Deterministic Ethernet and deterministic wireless generally utilize a communication scheduling mechanism (e.g., as computed by a supervisory device, such as a PCE) that requires the internal clocks of the nodes/devices along a network path to be synchronized. To do so, a time synchronization protocol, such as the Network Time Protocol (NTP) or Precision Time Protocol (PTP) can be used to effect clock synchronization among the network devices. The degree of clock precision among the devices often needs to be within microseconds or less.

The forwarding of each packet is then regulated by a deterministic communication schedule that specifies when the packet has to be transmitted to the wire or radio. This is done for each node/device along the network path. The specific time period is called a time slot. A supervisory device, sometimes referred to as the "orchestrator," usually performs the computation of this path and the associated timetable. Such an approach is akin to a PCE in MPLS networks, in order to compute Traffic Engineering Label Switched Paths, with the major difference being that a time schedule is computed instead of simply a constrained shortest path (e.g., the path in a deterministic network having both spatial and temporal aspects).

When the supervisory device completes computation of the deterministic communication schedule, it may then download the path and the timetable to each of the devices participating in the forwarding. In turn, these nodes will then begin receiving and sending packets according to the computed schedule. When more packets arrive in a given time interval than scheduled, a deterministic node/device will protect itself and declassify or drop packets. Accordingly, one potential timing issue that may occur in a deterministic network is the loss of timeliness (e.g., a packet not arriving at its destination within its scheduled time interval, as opposed to classical congestion loss.

Deterministic networking is a fundamental component of the IoT and can be used in a number of different use cases, ranging from industrial automation to inflight control systems to internal vehicle networking. Most of these application fields are mission critical and require very strict control in terms of timing.

Without clock synchronization, a deterministic network cannot work at all. There are various cases that can cause clock synchronization to fail in a network. These causes can include, but are not limited to, loss of a master clock, attack on the synchronization protocol (e.g., a delay attack, etc.), and other issues that can cause the clocks of the network devices to drift. To mitigate the effects of such issues, some deployments are now utilizing very complex clock systems with redundant clocks. However, this approach may not be feasible in many implementations. Moreover, clock synchronization mechanisms are still employed only at discrete times in the network, leading to the possibility of time synchronization anomalies occurring. Such anomalies may be due to misconfigurations, environmental effects on the internal clocks of nodes, or the like. In further cases, there also now exists the possibility of a time-based attack in which a malicious entity purposely causes a node in a deterministic network to sabotage the time synchronizations across the nodes, which can case deterministic packets to be dropped and/or for node buffers to overflow.

Time Synchronization Attack Detection in a Deterministic Network

The techniques herein allow for the detection of time synchronization anomalies in a deterministic network, such as those caused by an attack on the clock synchronization mechanism used in the network. In some aspects, the techniques herein introduce a probing mechanism that uses Operations, Administration, and Maintenance (OAM) packets to track the timing of packet deliveries along a deterministic path. In further aspects, the techniques herein may use machine learning to detect and isolate anomalies, such as those attributable to a time synchronization attack.

Specifically, according to one or more embodiments of the disclosure as described in detail below, a device receives data indicative of packet arrival times at a plurality of nodes along a path in a deterministic network. The device compares the packet arrival times to their corresponding scheduled delivery intervals in a deterministic communication schedule used by the nodes along the path. The device detects, using a machine learning-based anomaly detector, a time synchronization anomaly based on the comparisons between the packet arrival times and their scheduled delivery intervals. The device causes performance of a mitigation action in the network based on the detected time synchronization anomaly.

Illustratively, the techniques described herein may be performed by hardware, software, and/or firmware, such as in accordance with the time synchronization anomaly detection process 248, which may include computer executable instructions executed by the processor 220 (or independent processor of interfaces 210) to perform functions relating to the techniques described herein, e.g., in conjunction with routing process 244.

Figure 3:
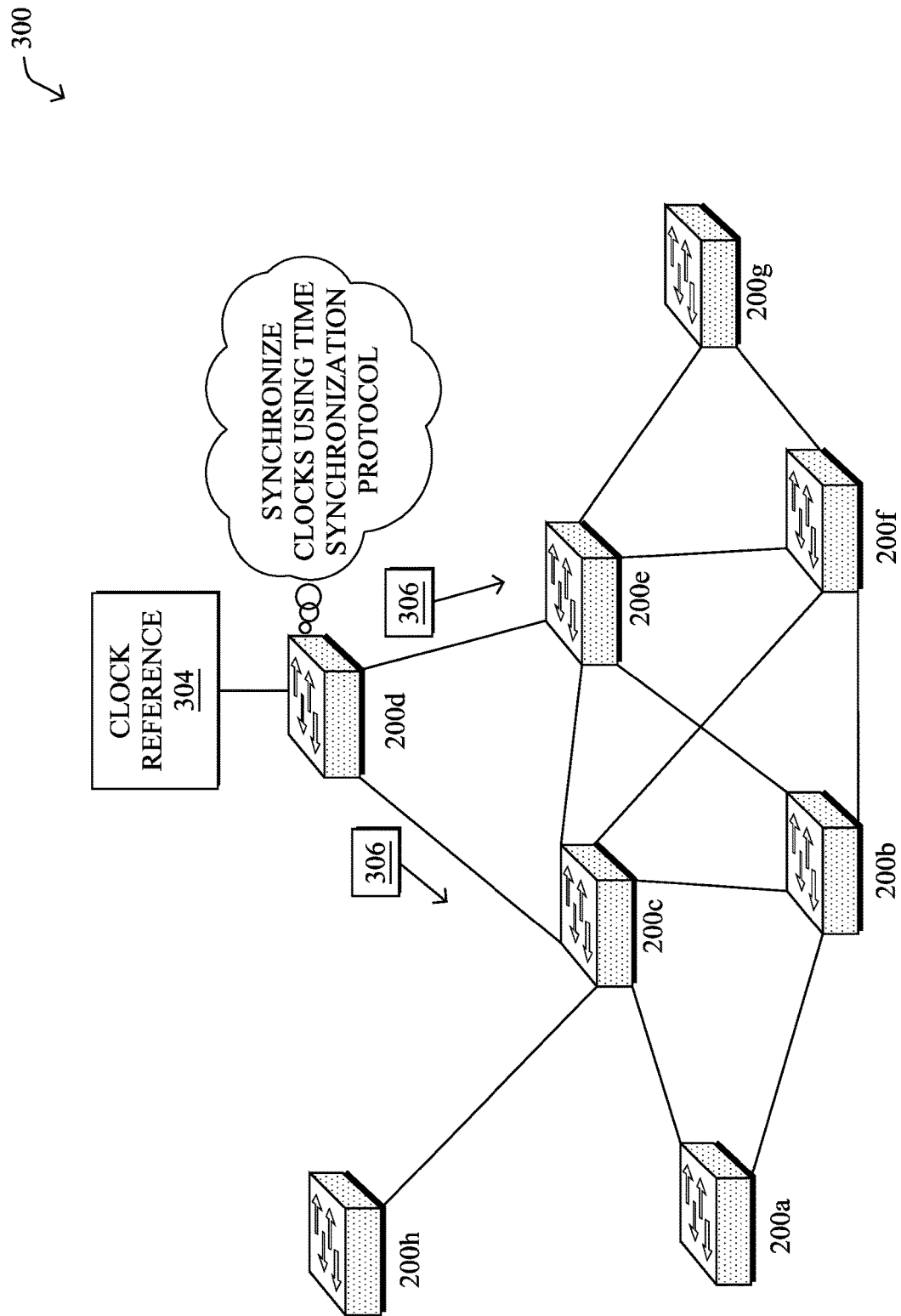
FIG. 3 illustrates an example of clock synchronization in a deterministic network.

Operationally, FIG. 3 illustrates an example of synchronizing clocks in a deterministic network, according to various embodiments. As shown, assume that there is a deterministic network 300 that comprises any number of nodes/devices 200 that are interconnected with one another. For illustrative purposes, the set of nodes/devices 200a-200h are shown. However, any number of nodes/devices may exist in an actual network deployment and using any number of different topologies. These devices may also comprise any number of networking devices, such as switches, routers, or the like. As would be appreciated, nodes/devices 200a-200h may be interconnected by hardwired links (e.g., Ethernet, etc.) or, alternatively, wireless links.

To synchronize the internal clocks of devices 200a-200h, network 300 may include a clock reference 304 that may be external or internal to device 200d shown. Sometimes also referred to as a "master clock," clock reference 304 maintains a clock to which each of devices 200a-200h may set their own clocks. To effect this clock synchronization, clock synchronization protocol messages 306 may be promulgated throughout network 300. For example, NTP and PTP messaging are suitable synchronization protocol messages that can be used to synchronize the clocks of devices 200a-200h. In other embodiments, the initial clock synchronization between devices 200a-200h may be performed simply by having a device send a packet with a timestamp that can be assessed by the receiver. In order to avoid loops, a distance vector protocol can be used for time diffusion.

In various embodiments, assume that a supervisory device/orchestrator has computed network paths between devices 200a-200h as generated a corresponding deterministic communication schedule to implement these paths. When installed to devices 200a-200h, the deterministic communication schedule specifies to a given device 200 the time interval(s) at which the device is expected to send packets to the neighbor(s) of the device, as well as the time intervals at which the device expects to receive packets from its neighbor(s). So long as each of the devices along a given network path are sent and received within their scheduled time interval, delivery of a packet can be guaranteed within a bounded timeframe. Usually at the edge of a deterministic network the UNI interface offers a buffering system and then ensure that packet flows which enter the deterministic network conform to the specification (e.g., using od shapers). This means that exact clock synchronization should happen within the network only for effective deterministic transmission.

Of course, ensuring packet delivery within its bounded delivery time interval requires that the clocks of each of the devices 200a-200h remain synchronized to a very precise degree. If not, the differences between the clocks of two or more of the devices along a path could cause the packet to arrive at its destination outside of its scheduled delivery time interval. In some cases, packets that arrive outside of their scheduled delivery intervals may even be dropped by the network, intentionally.

FIGS. 4A-4E illustrate examples of a deterministic path 400, in various embodiments. Continuing the example of FIG. 3, assume that devices 200a, 200b, 200f, and 200g form deterministic path 400 in network 300. Accordingly, the clocks of devices 200a, 200b, 200f, and 200g may be synchronized via a time synchronization protocol, such as PTP or NTP. In addition, communications along path 400 may be scheduled (e.g., by a supervisor/orchestrator), to guarantee packet delivery within a very short time interval. For example, device 200a may be scheduled to send a packet to device 200b during a defined time interval, device 200b may be scheduled to receive a packet from device 200a during a defined time interval, etc.

One characteristic of a deterministic network is that the network is congestion-less, since each transmission is pre-scheduled. In other words, in TSN, this means that a a packet should be present in the emitting queue at the time it should be sent to the media. Similarly, in AVB, this means that the outgoing buffer is stable and is not filling up more than expected. In time triggered networks, this means that a packet should be received at the exact time defined in the schedule. However, desynchronization of the devices along the deterministic path can cause these conditions to be unmet. In some cases, this desynchronization is due to mechanical failures, environmental conditions, or the like. However, in more malicious cases, jitter and/or skew can be injected into the path by a third party (e.g., by introducing additional load on a device, to affect its accuracy), or by introducing delays in the time synchronization protocol itself (e.g., using a man-in-the-middle to act as a delay line).

According to various embodiments, the techniques introduced herein propose a form of Operations, Administration, and Maintenance (OAM) mechanism that detects time synchronization anomalies in a deterministic data path, such as path 400. Such a detection mechanism may be triggered by any or all of the following conditions:

In one embodiment, an OAM packet may be sent along the deterministic path, to capture timestamps at each of the receiving devices, which can then be compared hop-by-hop with a reference. Such an OAM packet may be sent periodically or on demand, in various cases. For example, in FIG. 4A, device 200a may send OAM packet 402 to device 200b, according to the deterministic communication schedule for path 400. In turn, in FIG. 4B, device 200b may timestamp OAM packet 402 and forward it on to device 200c during its own scheduled communication interval. This process may be repeated any number of times as packet 402 propagates along path 400. In turn, a device detecting an anomaly in OAM packet 402 may use OAM packet 402 as a time base for the flow. In other words, the device may consider that OAM packet 402 was received in due time and skew its sense of time as OAM packet 402 indicates for that particular flow.

Figure 4A:
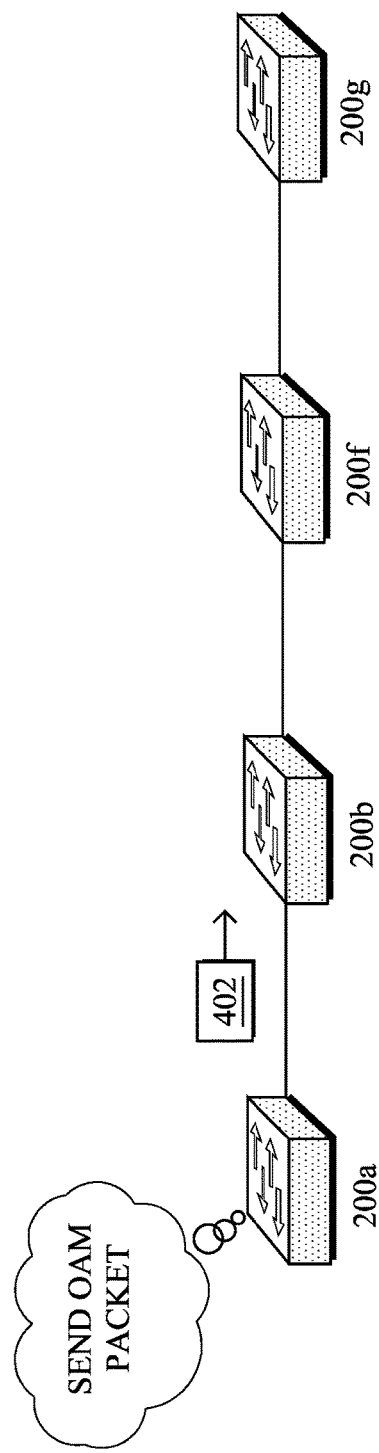
FIGS. 4A-4E illustrate examples of a deterministic path.
Figure 4B:
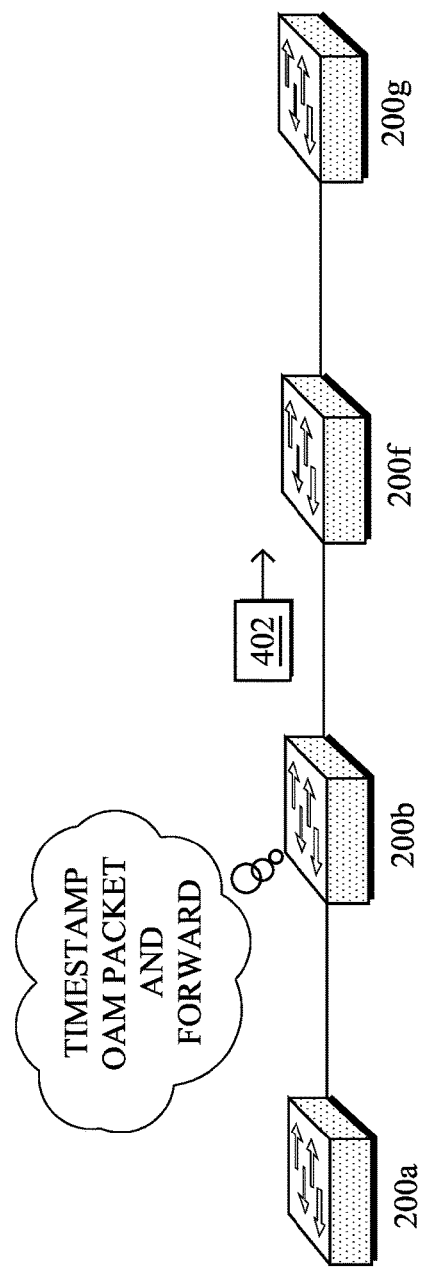
Figure 4C:
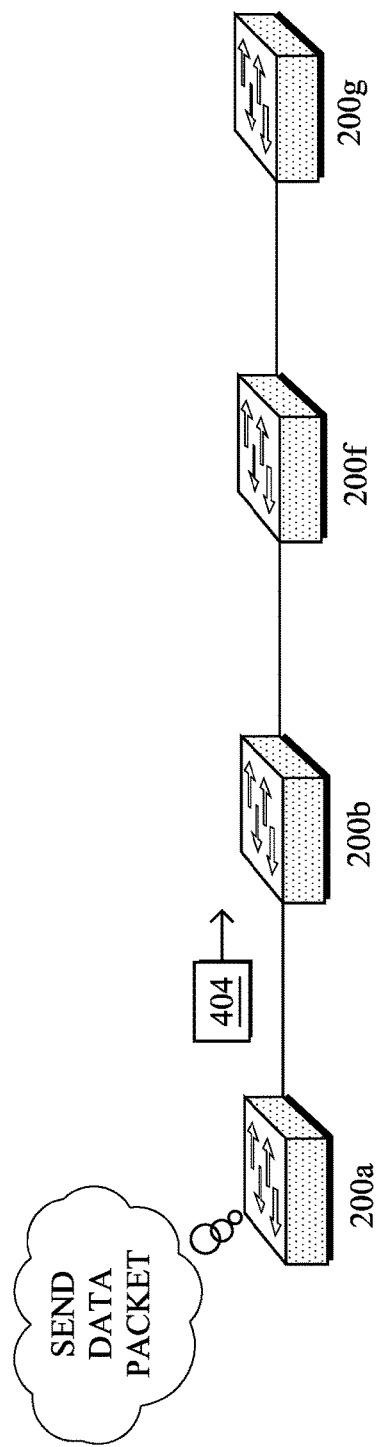
Figure 4D:
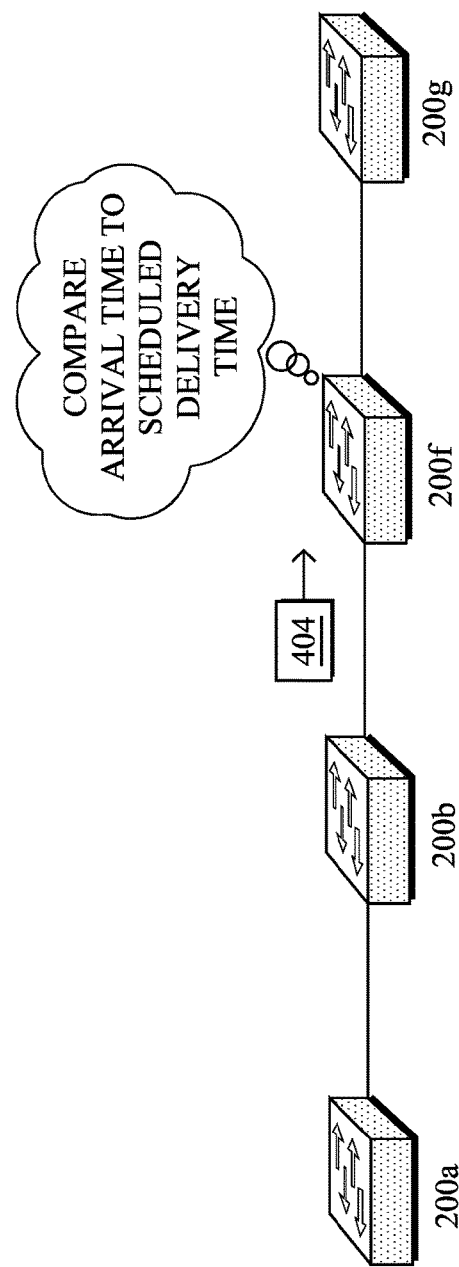
Figure 4E:
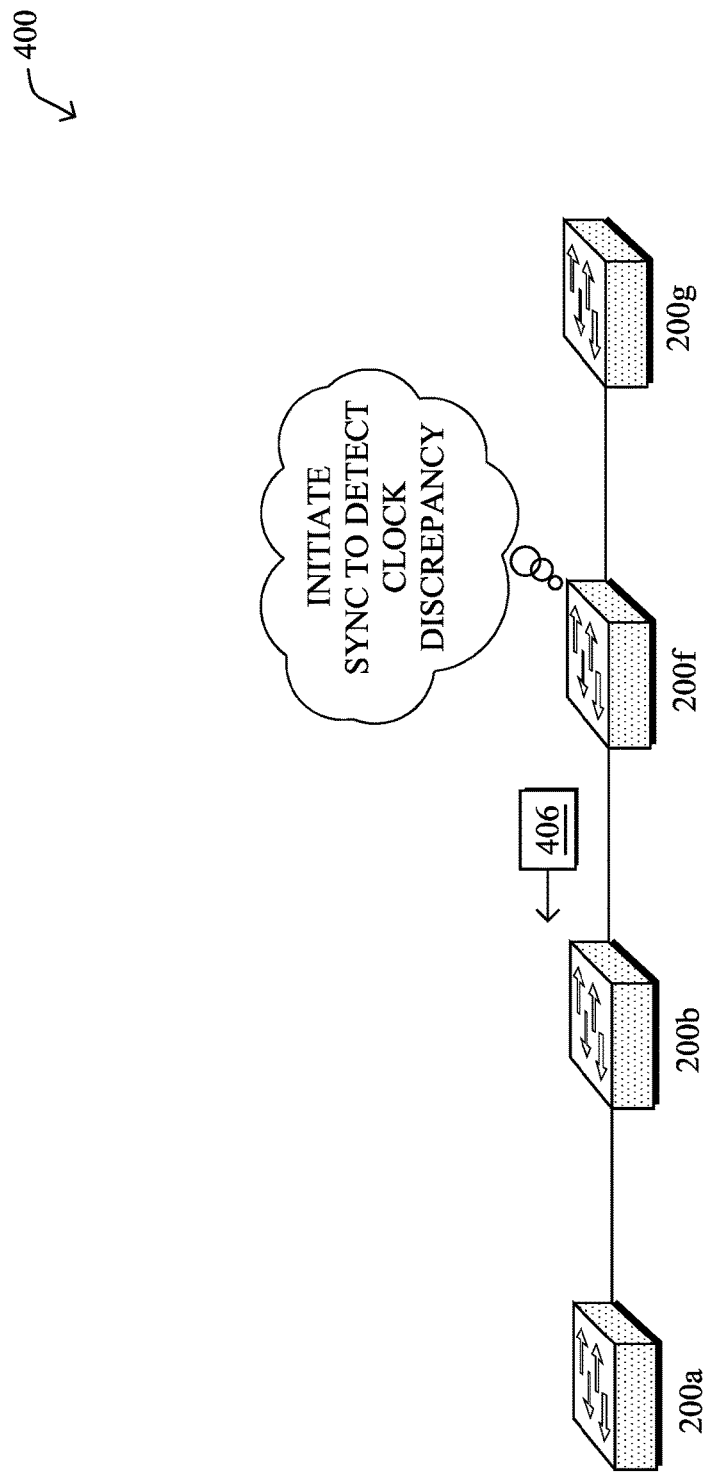

In another embodiment, a node/device 200 detecting an issue in the deterministic flow itself (e.g., the actual data packets sent via the deterministic path), such as the packets arriving off schedule, may attempt to determine whether its own sense of time is different from that of the previous node/device. For example, as shown in FIG. 4C, assume that device 200a sends data packet 404 along path 400. Then, as shown in FIG. 4D, when device 200f receives data packet 404, it may compare the arrival time of packet 404 with its own delivery interval according to the deterministic communication schedule. For example, as shown in FIG. 4E, device 200f may initiate a time synchronization with device 200b using PTP, NTP, or the like, by sending a synchronization request 406 to device 200b. Doing so allows device 200f to detect a clock discrepancy between the clocks of devices 200b and 200f. In some embodiments, this may be done using a different clock instance, to capture the variations but not actually set the local crystals of device 200f, but not impact the 'official clock' of device 200f.

As it goes, the issue may be injected earlier up the path by another node several hops away. Using the techniques herein, the node/device that encounters a clock discrepancy may send a request to the source of the TSN/DetNet flow, thereby triggering the sending of an OAM message asynchronously and effectively asking each device along the path, for that specific flow, to time stamp the packets and compare them with the schedule. As a result of the OAM mechanism, discrepancies vs. the schedule can be located and timing issues can be addressed.

Figure 5:
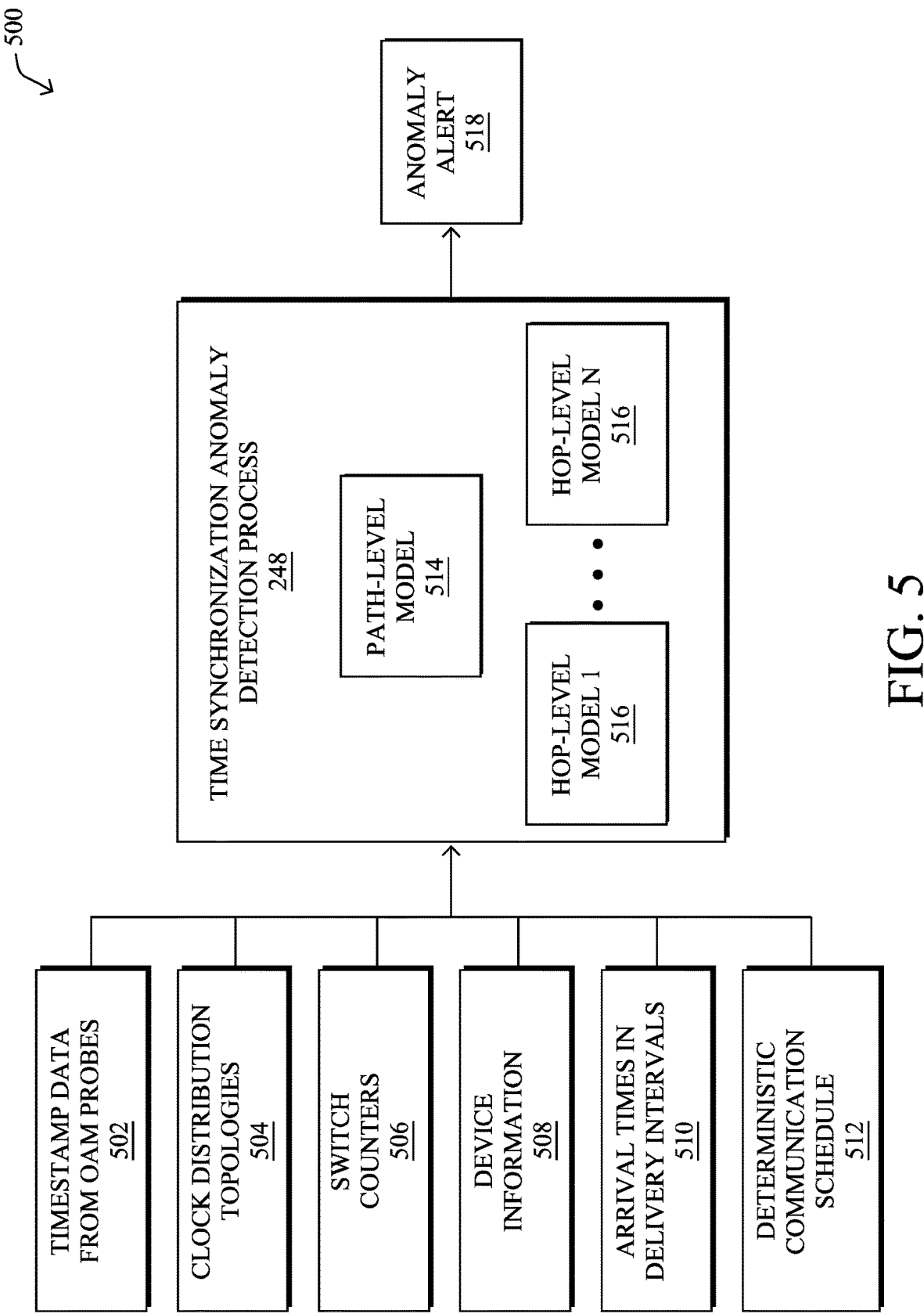
FIG. 5 illustrates an example architecture for detecting time synchronization attacks in a deterministic network.

FIG. 5 illustrates an example architecture 500 for detecting time synchronization attacks in a deterministic network, according to various embodiments. At the core of architecture 500 is time synchronization anomaly detection process 248, which may be executed by a node/device 200 in a network, such as a hop along a deterministic network path, path endpoint, or a device in communication therewith. According to various embodiments, time synchronization anomaly detection process 248 may include one or more machine learning-based models that take as input any or all of the following input data:

Timestamp data 502 from OAM probes—e.g., the per-hop timestamps added to an OAM packet sent along a deterministic path.

Clock distribution topologies 504—e.g., the network topology and links used by the time synchronization protocol, such as NTP or PTP.

Switch counters 506—e.g., ARP information, ND traffic, etc.

Device Information 508—e.g., CPU availability or usage, memory availability or consumption, release, IPFIX or Netflow records, etc.

Arrival Times in Delivery Intervals 510—e.g., the arrival times of deterministic traffic within the scheduled delivery interval on the path. As multiple flows can be coming from different paths, some flows may still arrive on time, while others may be delayed due to a time synchronization attack.

Deterministic Communication Schedule 512—e.g., the communication schedule that specifies the time interval during which a device along the deterministic path can send or receive data sent along the path.

In various embodiments, time synchronization anomaly detection process 248 may include a path-level model 514 configured to detect timing anomalies along the deterministic path and/or n-number of hop-level models 516 configured to determine whether the timing of the individual hops/devices along the path is anomalous.

In a simple case, time synchronization anomaly detection process 248 may detect a time synchronization anomaly using models 514-516 by assessing the statistical deviation of arrival times at each hop. In further embodiments, time synchronization anomaly detection process 248 may use model 514-516 to perform regression of quantile on the expected times at each hop. Since the time scheduled is known to process 248 (e.g., from deterministic communication schedule 512), and timestamped of arrival of packets are provide by OAM probing (e.g., timestamp data 502), it becomes possible for process 248 to compute for each packet the delta between the effective arrival and expected delivery interval according to the schedule. In a perfect world, the difference between the arrival time and scheduled delivery time, delta, (where I is the packet index), should always be equal to zero in a deterministic network. An alternative approach to detecting time synchronization anomalies entails extending path-level model 514 to cover the total transit time along the deterministic path, e.g., (departure_time−arrival_time), to take into account the device delays.

Model 514-516 may take into account any or all of the input data 502-512 and be trained on a server or other device at which a regressor is used to evaluate a lower bound and upper bound for the delta, as well as a confidence interval. Since deterministic networks are highly predictable under normal conditions, model 514-516 may evaluate the $25^{th}$ and $75^{th}$ percentiles, for example, with a small scaling factor, since the distributions are expected to be very peaky. Doing so would result in a lowered risk of false positives, even in the presence of a sensitive model (e.g., a small scaling factor). Of course, other percentiles can be used, as desired.

It is also important to note that time synchronization anomaly detection process 248 may also include any number of hop-level models 516. In various embodiments, process 248 can use hop-level models 516 to identify a slowly drifting clock of a particular device along a deterministic path, which may be indicative of a denial of service/time synchronization attack. For example, when process 248 detects an anomaly along a deterministic network path using path-level model 514, process 248 may then determine whether there is also an anomaly detected along any given hop of the path using its corresponding hop-level model 516. If the anomaly is the result of cumulative clock drift along the path, it is likely that path-level model 514 will detect the anomaly, but that none of hop-level models 516 will detect a corresponding anomaly. In other words, it may be the case that the clocks of a plurality of devise along the path are drifting, thereby making the timing along the path anomalous, but their individual drifts may be slight enough so as not to be considered anomalous on their own.

Time synchronization anomaly detection process 248 may also detect time synchronization attacks using models 514-516. In particular, if process 248 detects an anomaly along the deterministic path using path-level model 514, it may assess the differences between the arrival times and scheduled delivery times of the individual hops along the path using model(s) 516. If a hop level anomaly is also detected for a specific device along the path, this is a strong indication that the device is the source of the attack.

Generally speaking, maintaining hop-level models 516 for each device along a deterministic path is not very resource intensive. However, in some embodiments, resources can be conserved by having time synchronization anomaly detection process 248 maintain only one model 516 per type of node, as opposed to per node/link. For example, process 248 may use a clustering technique (e.g., k-means, etc.), to group similar devices along the path by their characteristics (e.g., types, configurations, locations in the clock distribution topology, etc.). In yet another embodiment, process 248 may compute a per-device model 516 on the fly for a given path, when OAM probing of the path is performed.

When time synchronization anomaly detection process 248 detects an anomaly, it may generate and send an anomaly alert 518, to cause the performance of a mitigation action. Such a mitigation action may entail, for example, block traffic from one or more of the nodes/devices along the path (e.g., in the case of a detected synchronization attack), re-computing the deterministic communication schedule, or re-synchronizing the clocks of the devices via the synchronization protocol. In further embodiments, anomaly alert 518 may be sent to a user interface for review by a network administrator. In such cases, alert 518 may also propose a solution to the problem. For example, process 248 may detect the root cause of the time synchronization discrepancy (e.g., the node in the time propagation tree that injects the error) and alert the administrator to restore the operations of the failing node/device. This can also be done in conjunction with causing the network to use a different time distribution tree to avoid the issue. If the problem is an attack, which can be inferred by a different propagation pattern, then the automation needs to isolate multiple affected node, maybe even bringing the network down around them.

In other words, the techniques herein introduce an OAM mechanism to probe the timing of packet deliveries along a path in a deterministic network. This timing information can then be used with path-level and/or hop-level anomaly detection models, to detect time synchronization anomalies in the network and cause the performance of a mitigation action, when an anomaly is detected.

The feasibility of the OAM probing for timing introduced herein can be inferred from the operations of the PTP protocol itself. Notably, in PTP, a mater device sends a Sync message to its slave, followed by a Follow_Up message. In turn, the slave device sends a Delay_Request message back to the master, which responds with a Delay_Response message. Just as in the Sync message, the header of the OAM packet can be generated with a fillable portion where the deterministic ASIC of the receiving device knows to place a timestamp during transmission. In PTP, the Sync message may or may not be followed by a Follow-Up message. The latter is only needed when the hardware is not capable of timestamping on the fly. This means that the techniques herein can be performed with very, very short latency and no jitter. This also indicates that the OAM probing can also be done in two passes, also using a follow-up, but this time end-to-end. In the first pass, the measure OAM message would flow end-to-end, and on each hop, the hardware sends an event to the software with the timestamp. On a second pass, the timestamps are gathered asynchronously at all nodes and carried to the destination, where it can be passed on to process 248 for analysis.

Figure 6:
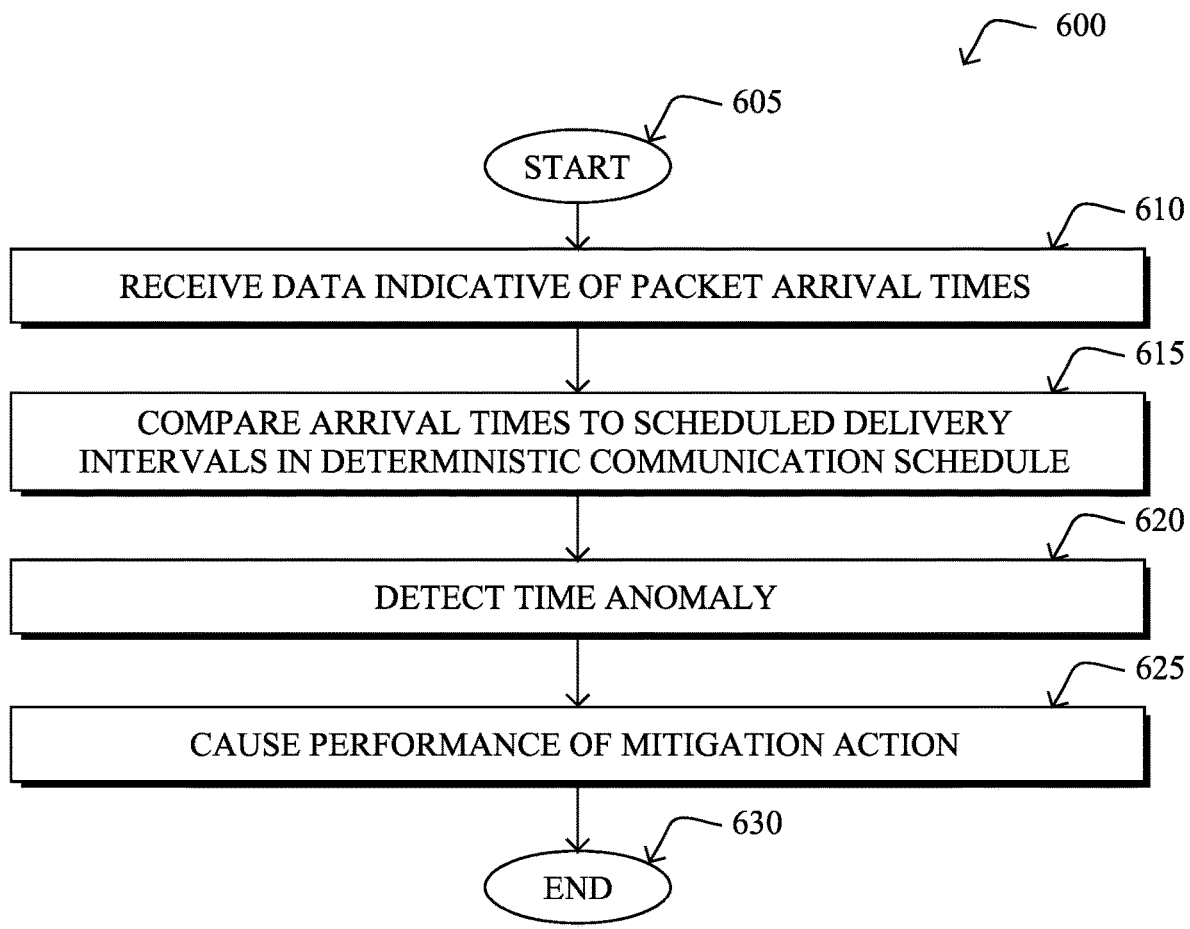
FIG. 6 illustrates an example simplified procedure for detecting time synchronization attacks.

FIG. 6 illustrates an example simplified procedure for detecting time synchronization attacks, in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the device may receive data indicative of packet arrival times at a plurality of nodes along a path in a deterministic network. In various embodiments, this data may be obtained via the sending of one or more OAM packets along the path and having each node along the path stamp the OAM packet(s) with their arrival times.

At step 615, as detailed above, the device may compare the packet arrival times to their corresponding scheduled delivery intervals in a deterministic communication schedule used by the nodes along the path. In other words, the transmission and delivery time intervals between any two devices along a network path may be pre-defined. Ideally, the actual packet delivery times will match the scheduled delivery intervals and can be expected to be directly in the center of its scheduled delivery interval. Similarly, a cumulative approach can be taken to assess the total transit time along the path vis-à-vis its scheduled times.

At step 620, the device may detect, using a machine learning-based anomaly detector, a time synchronization anomaly, as described in greater detail above. In various embodiments, this may be based on the comparisons between the packet arrival times and their scheduled delivery intervals. Such a model may model the timing behavior of the entire deterministic path, in some cases. Thus, if the timing behavior of the path differs from the model by a threshold amount (e.g., statistically differs from the model by a certain amount), the device may determine that a time synchronization anomaly exists. In further embodiments, one or more hop-level models may also be used to detect time synchronization anomalies at individual devices along the deterministic path. If the device also detects a hop-level anomaly in conjunction with the path-level anomaly, this may indicate that a time synchronization attack is present. Conversely, if no hop-level anomaly is detected, this may simply indicate that the anomaly is attributable to cumulative clock drift along the path.

At step 625, as described in greater detail above, the device may cause the performance of a mitigation action in the network based on the detected time synchronization anomaly. Such a mitigation action may be selected based on the type of anomaly, in some cases (e.g., whether the anomaly is suspected of being indicative of an actual attack). For example, the mitigation action may include any or all of the following: blocking traffic from one or more of the nodes along the path, sending an anomaly detection alert, adjusting the deterministic communication schedule, or clock re-synchronization of the nodes along the path. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the detection of time synchronization anomalies in a deterministic network. Without very precise synchronization, the deterministic network may begin dropping packets. In further aspects, the techniques herein can be used to further distinguish between time synchronization anomalies that are likely to be caused by a malicious attack on the deterministic network and anomalies that may be caused by other factors (e.g., clock drift due to environmental factors, hardware configurations, etc.). In turn, mitigation actions can be effected in the network, when a time synchronization anomaly is detected.

While there have been shown and described illustrative embodiments that provide for the detection of time synchronization anomalies in a deterministic network, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as NTP and PTP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device, data indicative of packet arrival times at a plurality of nodes along a path in a deterministic network;
comparing, by the device, the packet arrival times to their corresponding scheduled delivery intervals in a deterministic communication schedule used by the nodes along the path;
applying, by the device, one or more hop-level anomaly detectors to the comparisons between the packet arrival times and their scheduled delivery intervals of one or more individual nodes along the path;
detecting, by the device and using a machine learning-based anomaly detector, a time synchronization anomaly based on the comparisons between the packet arrival times and their scheduled delivery intervals;
determining, by the device, when the time synchronization anomaly is caused by cumulative clock drift among the nodes, based on the one or more hop-level anomaly detectors not detecting a corresponding anomaly; and
causing, by the device, performance of a mitigation action in the network based on the detected time synchronization anomaly.

2. The method as in claim 1, wherein the mitigation action comprises one of: blocking traffic from one or more of the nodes along the path, sending an anomaly detection alert, or clock re-synchronization of the nodes.

3. The method as in claim 1, wherein the data indicative of the packet arrival times at the plurality of nodes along the path in the deterministic network is obtained by sending one or more Operations, Administration, and Maintenance (OAM) packets along the path, wherein the nodes along the path timestamp the one or more OAM packets with their arrival times.

4. The method as in claim 1, wherein the anomaly detector is a path-level anomaly detector that comprises a model for the path.

5. The method as in claim 4, further comprising:
determining, by the device, that the time synchronization anomaly is caused by a time synchronization attack launched by a particular one of the nodes along the path, based on the hop-level anomaly detector for the particular node detecting a time synchronization anomaly that corresponds to the time synchronization anomaly detected by the path-level anomaly detector.

6. The method as in claim 4, further comprising:
clustering, by the device, the received data for two or more of the nodes along the path, based on the two or more nodes being of the same node type; and
training, by the device, a hop-level anomaly detector using the clustered data; and
using, by the device, the trained hop-level anomaly detector to detect hop-level time synchronization anomalies at the two or more nodes.

7. The method as in claim 1, wherein the nodes along the path comprise Ethernet switches.

8. The method as in claim 1, further comprising:
training, by the device, the machine learning-based anomaly detector using one or more of: a clock distribution topology for the nodes, configuration information regarding the nodes, or the deterministic communication schedule.

9. An apparatus, comprising:
one or more network interfaces to communicate with a network;
a processor coupled to the network interfaces and adapted to execute one or more processes; and
a memory configured to store a process executable by the processor, the process when executed configured to:
receive data indicative of packet arrival times at a plurality of nodes along a path in a deterministic network;
compare the packet arrival times to their corresponding scheduled delivery intervals in a deterministic communication schedule used by the nodes along the path;
apply one or more hop-level anomaly detectors to the comparisons between the packet arrival times and their scheduled delivery intervals of one or more individual nodes along the path;
detect, using a machine learning-based anomaly detector, a time synchronization anomaly based on the comparisons between the packet arrival times and their scheduled delivery intervals;
determine when the time synchronization anomaly is caused by cumulative clock drift among the nodes, based on the one or more hop-level anomaly detectors not detecting a corresponding anomaly; and
cause performance of a mitigation action in the network based on the detected time synchronization anomaly.

10. The apparatus as in claim 9, wherein the mitigation action comprises one of: blocking traffic from one or more of the nodes along the path, sending an anomaly detection alert, or clock re-synchronization of the nodes.

11. The apparatus as in claim 9, wherein the data indicative of the packet arrival times at the plurality of nodes along the path in the deterministic network is obtained by sending one or more Operations, Administration, and Maintenance (OAM) packets along the path, wherein the nodes along the path timestamp the one or more OAM packets with their arrival times.

12. The apparatus as in claim 9, wherein the anomaly detector is a path-level anomaly detector that comprises a model for the path.

13. The apparatus as in claim 12, wherein the process when executed is further configured to:
determine the time synchronization anomaly is caused by a time synchronization attack launched by a particular one of the nodes along the path, based on the hop-level anomaly detector for the particular node detecting a time synchronization anomaly that corresponds to the time synchronization anomaly detected by the path-level anomaly detector.

14. The apparatus as in claim 12, wherein the process when executed is further configured to:
cluster the received data for two or more of the nodes along the path, based on the two or more nodes being of the same node type; and
train a hop-level anomaly detector using the clustered data; and
use the trained hop-level anomaly detector to detect hop-level time synchronization anomalies at the two or more nodes.

15. The apparatus as in claim 9, wherein the nodes along the path comprise Ethernet switches.

16. The apparatus as in claim 9, wherein the process when executed is further configured to:
train the machine learning-based anomaly detector using one or more of: a clock distribution topology for the nodes, configuration information regarding the nodes, or the deterministic communication schedule.

17. A tangible, non-transitory, computer-readable medium storing program instructions that cause a device to execute a process comprising:
receiving, at the device, data indicative of packet arrival times at a plurality of nodes along a path in a deterministic network;
comparing, by the device, the packet arrival times to their corresponding scheduled delivery intervals in a deterministic communication schedule used by the nodes along the path;
apply one or more hop-level anomaly detectors to the comparisons between the packet arrival times and their scheduled delivery intervals of one or more individual nodes along the path;
detecting, by the device and using a machine learning-based anomaly detector, a time synchronization anomaly based on the comparisons between the packet arrival times and their scheduled delivery intervals;
determining, by the device, when the time synchronization anomaly is caused by cumulative clock drift among the nodes, based on the one or more hop-level anomaly detectors not detecting a corresponding anomaly; and
causing, by the device, performance of a mitigation action in the network based on the detected time synchronization anomaly.

18. The computer-readable medium as in claim 17, wherein the mitigation action comprises one of: blocking traffic from one or more of the nodes along the path, sending an anomaly detection alert, or clock re-synchronization of the nodes.

* * * * *

UNITED STATES PATENT AND TRADEMARK OFFICE
CERTIFICATE OF CORRECTION

PATENT NO. : 10,673,883 B2
APPLICATION NO. : 15/978252
DATED : June 2, 2020
INVENTOR(S) : Patrick Wetterwald Page 1 of 1

It is certified that error appears in the above-identified patent and that said Letters Patent is hereby corrected as shown below:

In the Specification

Column 13, Line 10, please amend as shown:
delivery time, $delta_i$ (where I is the packet index), should Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*